(12) United States Patent
Chen

(10) Patent No.: US 8,320,123 B2
(45) Date of Patent: Nov. 27, 2012

(54) ELECTRONIC DEVICE WITH BIAXIAL PIVOTING MECHANISM

(75) Inventor: Yi-Chuan Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 113 days.

(21) Appl. No.: 13/088,430

(22) Filed: Apr. 18, 2011

(65) Prior Publication Data

US 2011/0255225 A1    Oct. 20, 2011

(30) Foreign Application Priority Data

Apr. 20, 2010 (TW) ................................ 99207172 U

(51) Int. Cl.
*G06F 1/16* (2006.01)

(52) U.S. Cl. ......... 361/679.59; 361/679.02; 361/679.26; 361/679.27; 361/679.55; 312/223.1; 312/223.2; 248/254; 248/918; 248/919

(58) Field of Classification Search .............. 361/679.59
See application file for complete search history.

(56) References Cited

U.S. PATENT DOCUMENTS

| | | | | |
|---|---|---|---|---|
| 5,901,035 A * | 5/1999 | Foster et al. | ............. | 361/679.55 |
| 6,097,592 A * | 8/2000 | Seo et al. | ................. | 361/679.55 |
| 6,473,296 B2 * | 10/2002 | Amemiya et al. | ....... | 361/679.27 |
| 6,961,240 B2 * | 11/2005 | Janicek | ..................... | 361/679.46 |
| 7,679,905 B2 * | 3/2010 | Wu et al. | .................. | 361/679.59 |
| 7,821,786 B2 * | 10/2010 | Hadad et al. | ............. | 361/679.59 |
| 7,855,883 B2 * | 12/2010 | Tang | ........................ | 361/679.55 |
| 7,948,753 B2 * | 5/2011 | Wang | ....................... | 361/679.59 |
| 2010/0118481 A1 * | 5/2010 | Wang | ....................... | 361/679.27 |
| 2011/0164377 A1 * | 7/2011 | Wang | ....................... | 361/679.55 |

* cited by examiner

*Primary Examiner* — Anthony Q Edwards

(74) *Attorney, Agent, or Firm* — Winston Hsu; Scott Margo

(57) ABSTRACT

An electronic device includes a first housing, a first pivoting mechanism disposed on a side of the first housing, a second housing, a second pivoting mechanism disposed on a side of the second housing, and a bridging component. A first end and a second end of the bridging component are respectively pivoted on the first pivoting mechanism and the second pivoting mechanism. The bridging component includes a first contacting portion for contacting against the side of the first housing when the first pivoting mechanism pivots on the first end so that the first housing rotates around the second housing at a first angle, and a second contacting portion for contacting against the side of the second housing when the second end pivots on the second pivoting mechanism so that the first housing rotates around the second housing at a second angle greater than the first angle.

10 Claims, 9 Drawing Sheets

ELECTRONIC DEVICE WITH BIAXIAL PIVOTING MECHANISM

BACKGROUND OF THE INVENTION

1. Field of the Invention

The present invention relates to an electronic device with a biaxial pivoting mechanism, and more particularly, to an electronic device with a biaxial pivoting mechanism for ergonomic design.

2. Description of the Prior Art

Please refer to FIG. 1. FIG. 1 is a diagram of a portable electronic device 10 in the prior art. The portable electronic device 10 includes an upper housing 12 whereon a display 14 is disposed, and a lower housing 16 whereon a keyboard 18 and other electronic components are disposed. Generally, the portable electronic device 10 further includes at least one protrusion 20 disposed on a bottom of the lower housing 16 for preventing abrasion of the bottom of the lower housing 16. The protrusion 20 of the portable electronic device 10 is small for preferred appearance, so that the lower housing 16 is horizontally placed on the table. Therefore, an inclined angle of the keyboard 18 of the portable electronic device 10 relative to the table does not correspond with a ergonomic design, and results ankylosis of a shoulder, a neck, and a wrist. In addition, a gap between the bottom of the lower housing 16 and the table is small, so that the portable electronic device 19 does not dissipate heat effectively. Thus, design of a portable electronic device having a pivoting mechanism with aesthetic and practicability is an important issue of the electronic industry.

SUMMARY OF THE INVENTION

The present invention provides an electronic device with a biaxial pivoting mechanism for ergonomic design for solving above drawbacks.

According to the claimed invention, an electronic device includes a first housing, a first pivoting mechanism disposed on a side of the first housing, a second housing, a second pivoting mechanism disposed on a side of the second housing, and a bridging component. A first end and a second end of the bridging component are respectively pivoted on the first pivoting mechanism and the second pivoting mechanism. The bridging component includes a first contacting portion for contacting against the side of the first housing when the first pivoting mechanism pivots on the first end so that the first housing rotates around the second housing at a first angle, and a second contacting portion for contacting against the side of the second housing when the second end pivots on the second pivoting mechanism so that the first housing rotates around the second housing at a second angle greater than the first angle.

According to the claimed invention, a torque of the first pivoting mechanism pivoting on the first end is smaller than a torque of the second pivoting mechanism pivoting on the second end.

According to the claimed invention, the bridging component comprises a bending portion connected to the first contacting portion and the second contacting portion and disposed on a supporting surface, and the bending portion rotates around the supporting surface to drive the second end of the bridging component to pivot on the second pivoting mechanism so that a gap is formed between the second housing and the supporting surface when the side of the first housing contacts against the first contacting portion of the bridging component.

According to the claimed invention, a third angle is formed between the second housing and the supporting surface when the side of the second housing contacts against the second contacting portion of the bridging component.

According to the claimed invention, the third angle is substantially less than 5 degrees.

According to the claimed invention, the bridging component is a U-shaped structure.

According to the claimed invention, the first angle is substantially 67.5 degrees.

According to the claimed invention, the second angle is substantially 135 degrees.

According to the claimed invention, a covering component is for covering the bridging component.

According to the claimed invention, a buffer is disposed on an outer side of the covering component for preventing abrasion of the covering component.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
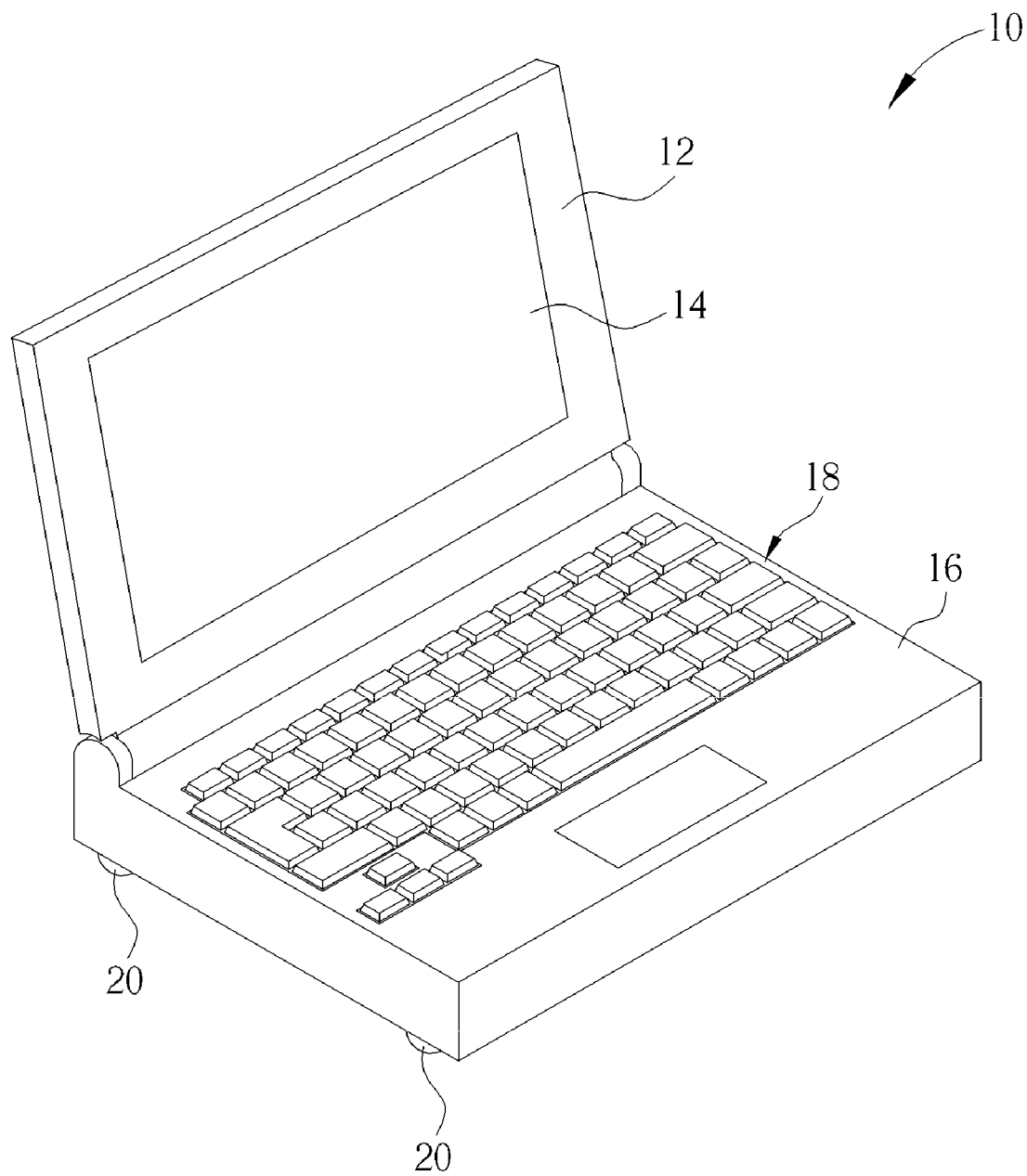
FIG. 1 is a diagram of a portable electronic device in the prior art.
Figure 2:
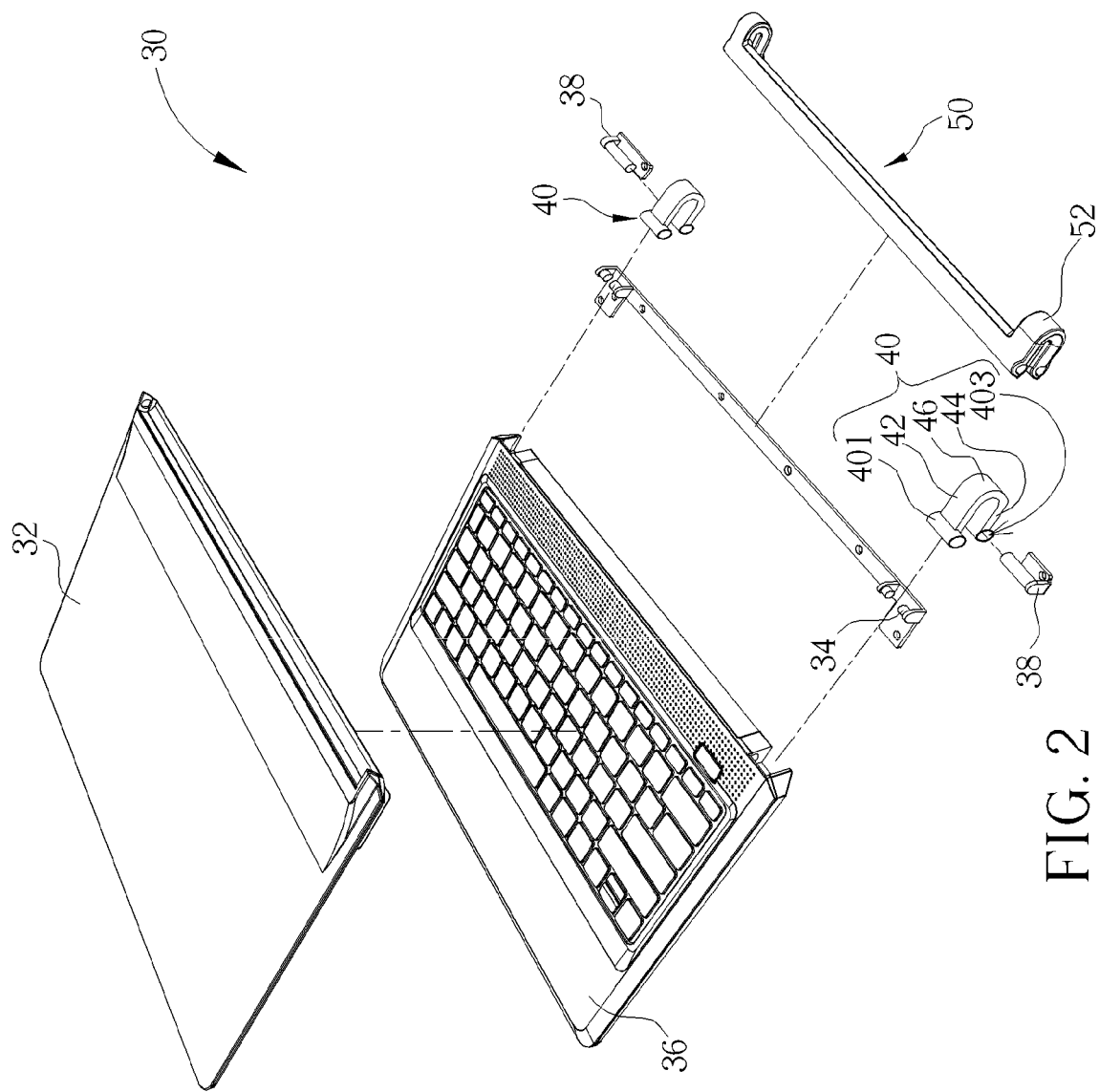
FIG. 2 is an exploded diagram of an electronic device according to a one of the embodiments of the present invention.
Figure 3:
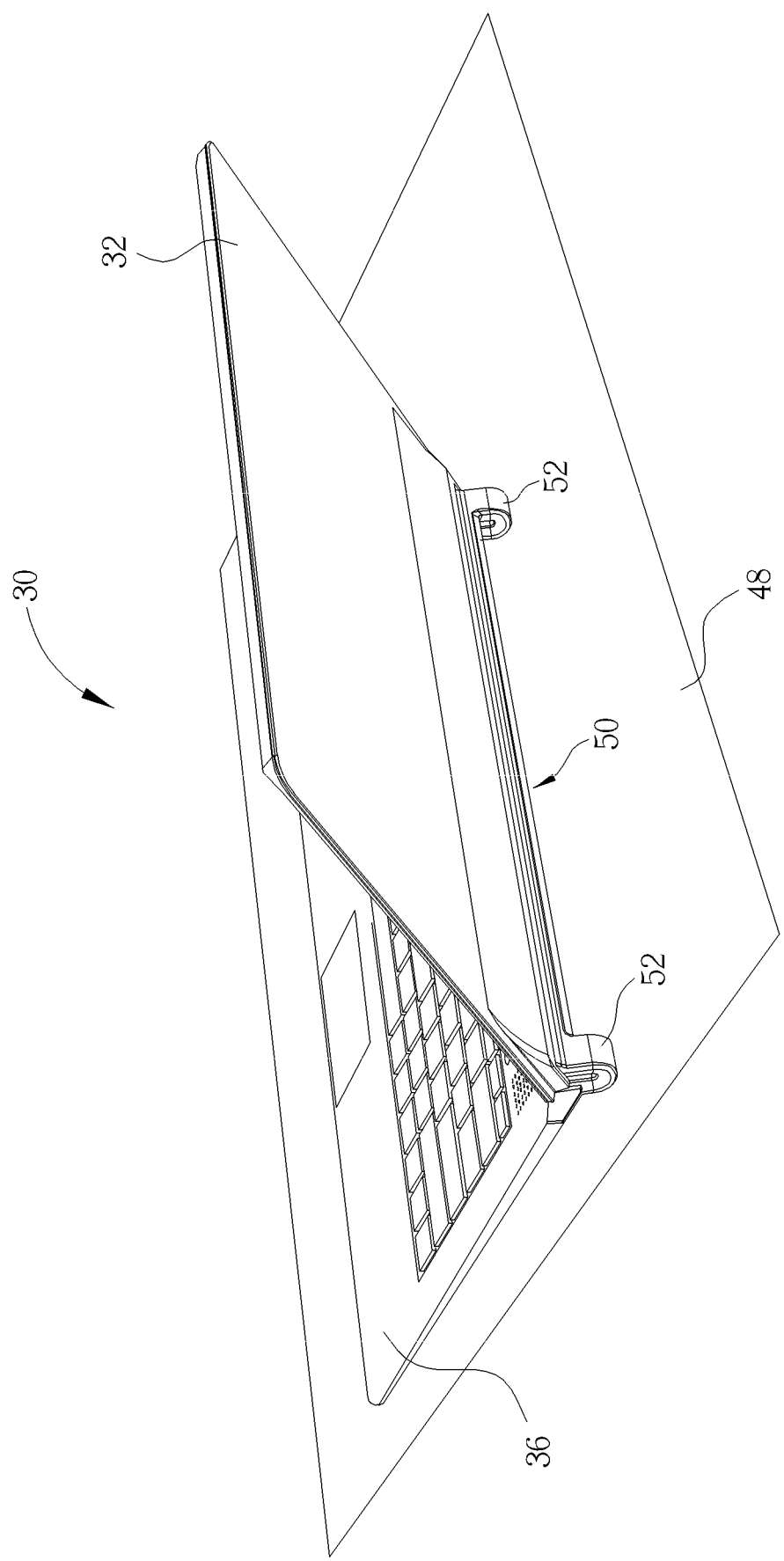
FIG. 3 is an assembly diagram of the electronic device according to one of the embodiments of the present invention.

Please refer to FIG. 2 and FIG. 3. FIG. 2 is an exploded diagram of an electronic device 30 according to an embodiment of the present invention. FIG. 3 is an assembly diagram of the electronic device 30 according to the embodiment of the present invention. The electronic device 30 can be a portable computer device, such as a notebook computer. The electronic device 30 includes a first housing 32, and a first pivoting mechanism 34 disposed on a side of the first housing 32. The first housing 32 can be an upper housing of the electronic device 30 for containing a liquid crystal display. The electronic device 30 further includes a second housing 36, and a second pivoting mechanism 38 disposed on a side of the second housing 36. The second housing 36 can be a lower housing of the electronic device 30 for containing a keyboard and other electronic components, such as a main board, a hard disk, and so on. The electronic device 30 further includes a bridging component 40. A first end 401 and a second end 402 of the bridging component 40 are respectively pivoted on the first pivoting mechanism 34 and the second pivoting mechanism 38. Therefore, the first housing 32 can pivot on the bridging component 40 via the first pivoting mechanism 34, and the bridging component 40 can pivot on the second housing 36 via the second pivoting mechanism 38, so that the electronic device 30 can be folded by pivoting the first housing 32 on the second housing 36. The electronic device 30 can further include a covering component 50 for covering the bridging component 40, so as to prevent abrasion of the bridging component 40. The electronic device 30 can further include a buffer 52 disposed on an outer side of the covering component 50. When the electronic device 30 is placed on a supporting surface 48, the buffer 52 can prevent abrasion of the covering component 50 due to rubbing with the supporting surface 48.

In addition, the bridging component 40 includes a first contacting portion 42. When the first pivoting mechanism 34 pivots on the first end 401 of the bridging component 40 so as to rotate the first housing 32 around the second housing 36 at a first angle $\theta_1$, the first contacting portion 42 contacts against the side of the first housing 32, so as to constrain a rotation between the first housing 32 and the bridging component 40. Generally, the first angle $\theta_1$ can be 67.5 degrees. The bridging component 40 further includes a second contacting portion 44. When the second end 403 of the bridging component 40 pivots on the second pivoting mechanism 38 so as to rotate the first housing 32 around the second housing 36 at a second angle $\theta_2$ substantially greater than the first angle $\theta_1$, the second contacting portion 44 contacts against the side of the second housing 36, so as to constrain a rotation between the bridging component 40 and the second housing 36. Generally, the second angle $\theta_2$ can be 135 degrees. Besides, a torque of the first pivoting mechanism 34 pivoting on the first end 401 is smaller than a torque of the second pivoting mechanism 38 pivoting on the second end 403. That is to say, when the first housing 32 starts to rotate, the bridging component 40 does not rotate around the second housing 36 immediately until the side of the first housing 32 contacts against the first contacting portion 42. When the side of the first housing 32 contacts against the first contacting portion 42, the first pivoting mechanism 34 can not pivot on the first end 401 of the bridging component 40 and the second pivoting mechanism 38 starts to pivot on the second end 403 of the bridging component 40. Values of the first angle $\theta_1$ and the second angle $\theta_2$ are not limited to the above-mentioned embodiment, and it depends on design demand.

Furthermore, the bridging component 40 can further include a bending portion 46 connected to the first contacting portion 42 and the second contacting portion 44 for placing on a supporting surface 48. For example, the bridging component 40 can be a U-shaped structure. When the first housing 32 rotates around the bridging component 40 and the side of the first housing 32 contacts against the first contacting portion 42 of the bridging component 40, the bending portion 46 can rotate around the supporting surface 48, so as to drive the second end 403 of the bridging component 40 to pivot on the second pivoting mechanism 38, and to form a gap H between the second housing 36 and the supporting surface 48. The gap H varies with the rotation angle of the bending portion 46 relative to the supporting surface 48. For example, there is the maximum gap H when the side of the second housing 36 contacts against the second contacting portion 44. At this time, a third angle $\theta_3$ is formed between the second housing 36 and the supporting surface 48, and the third angle $\theta_3$ can substantially less than 5 degrees. Values of the third angle $\theta_3$ is not limited to the above-mentioned embodiment, and it depends on design demand.

Figure 4:
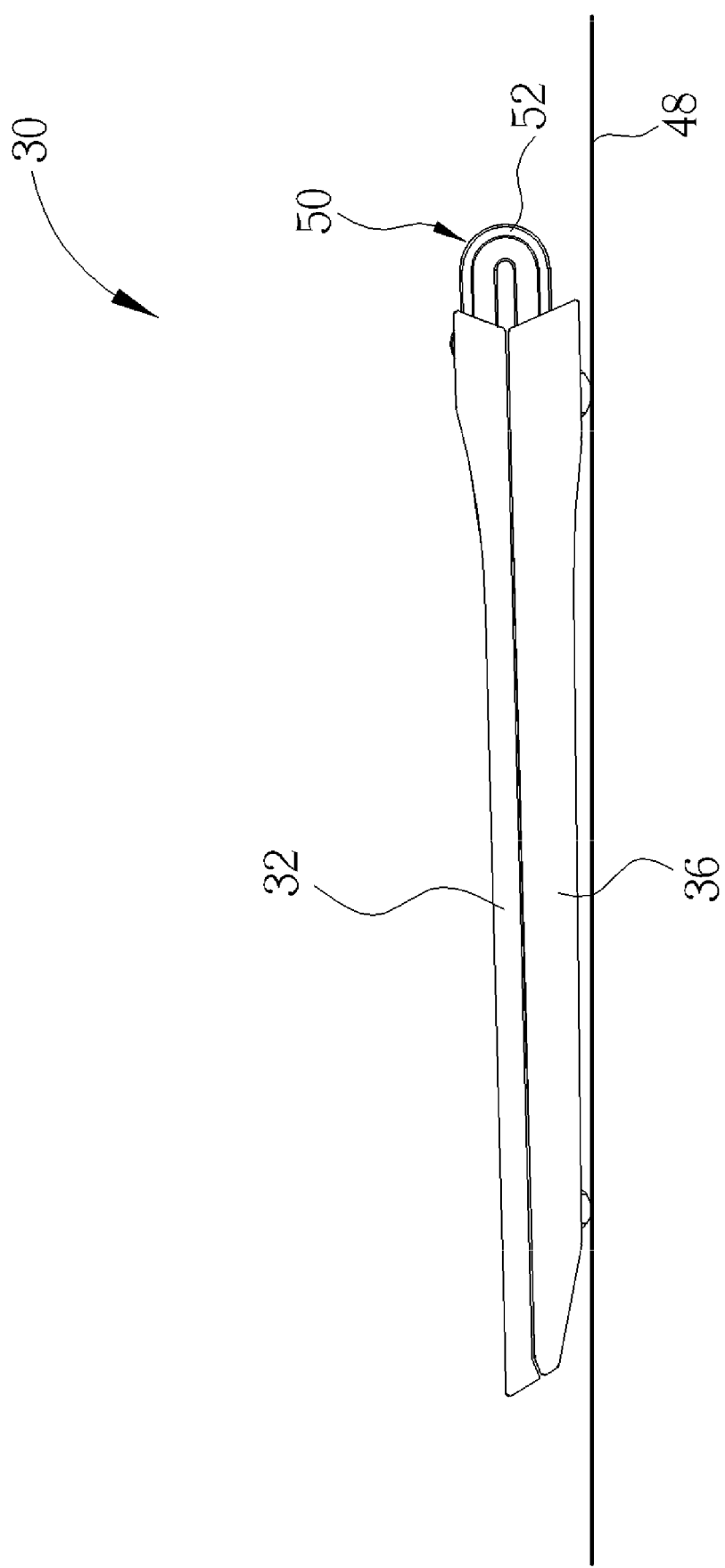
FIG. 4 is a diagram of the closed electronic device according to one of the embodiments of the present invention.
Figure 5:
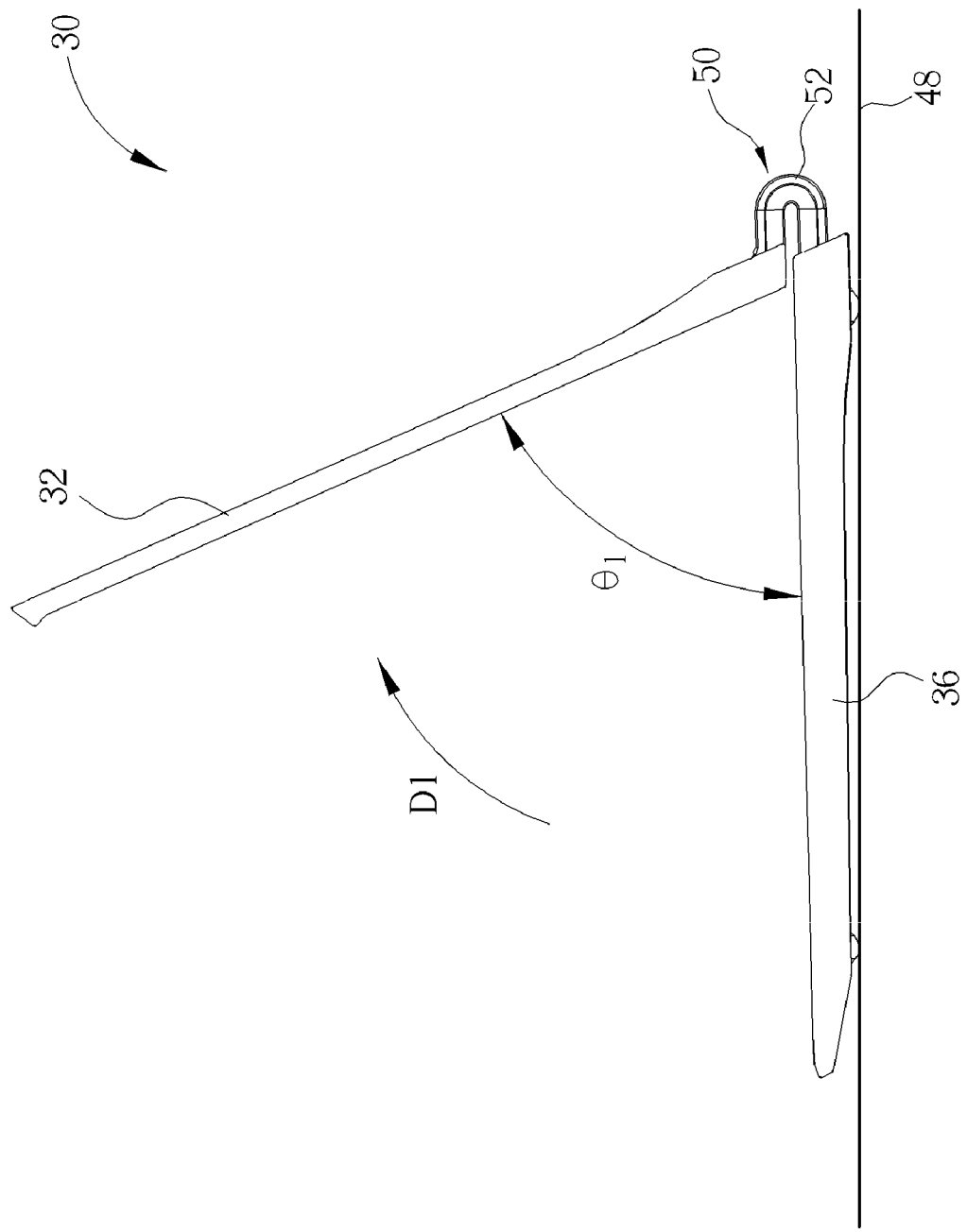
FIG. 5 is a diagram of the electronic device in an opening process according to one of the embodiments of the present invention.
Figure 6:
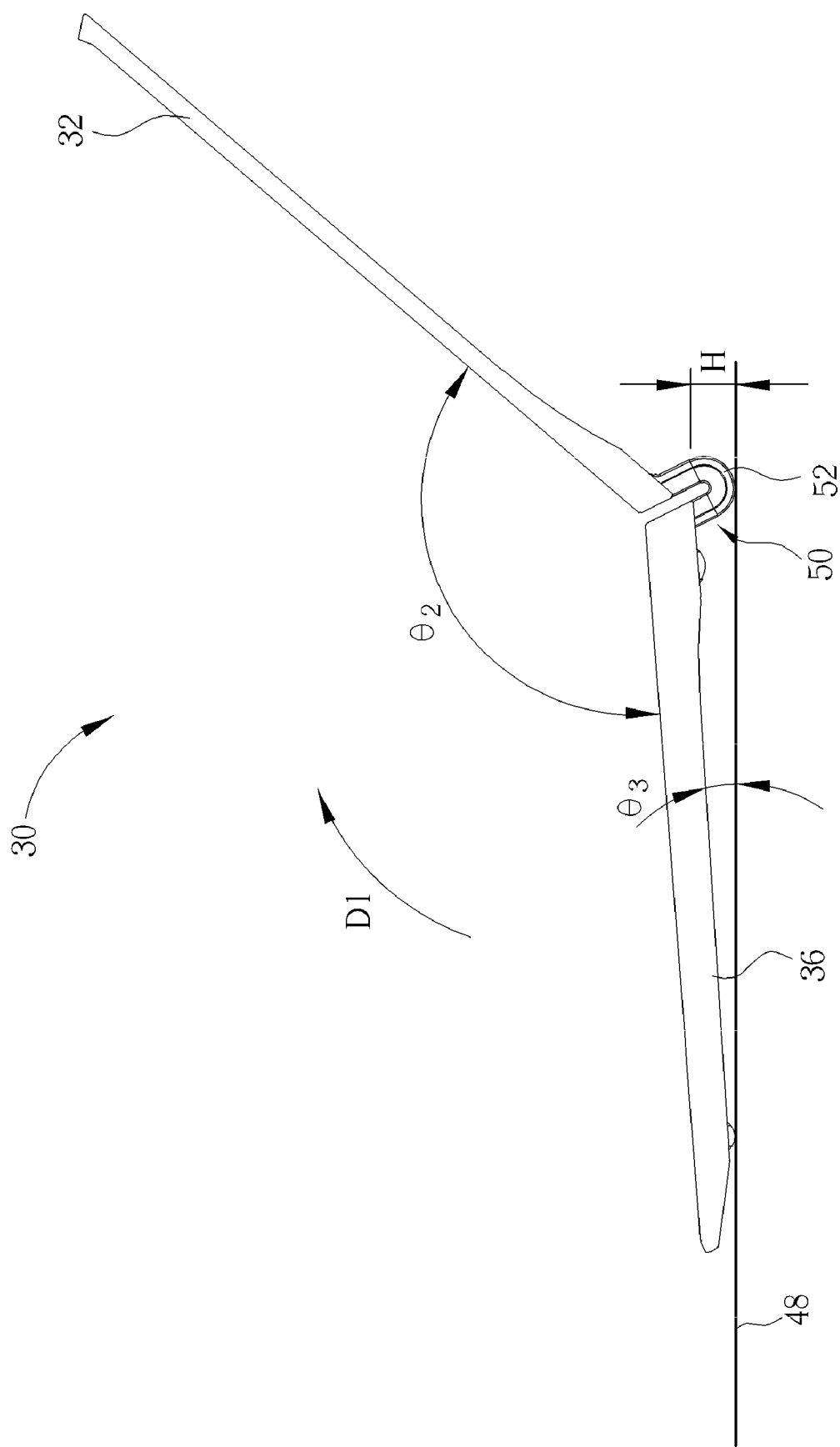
FIG. 6 is a diagram of the electronic device at a maximal angle according to one of the embodiments of the present invention.

Please refer to FIG. 2 and FIG. 4 to FIG. 6. FIG. 4 is a diagram of the closed electronic device 30 according to one of the embodiments of the present invention. FIG. 5 is a diagram of the electronic device 30 in an opening process according to one of the embodiment of the present invention. FIG. 6 is a diagram of the electronic device 30 at a maximal opening angle according to one of the embodiments of the present invention. When operating the electronic device 30, a user can rotate the first housing 32 from a position as shown in FIG. 4 to a position as shown in FIG. 5 along a clockwise direction D1. Because the torque of the first pivoting mechanism 34 pivoting on the first end 401 is smaller than the torque of the second pivoting mechanism 38 pivoting on the second end 403, which means the torque for driving the second pivoting mechanism 38 is greater than the torque for driving the first pivoting mechanism 34, the user can not rotate the bridging component 40 around the second housing 36 when starting to push the first housing 32 to pivot on the bridging component 40. At this time, a bottom of the second housing 36 is placed on the supporting surface 48. As shown in FIG. 5, when the first housing 32 pivots on the second housing 36 at the first angle $\theta_1$ along the clockwise direction D1, the side of the first housing 32 contacts against the first contacting portion 42 of the bridging component 40, which means the first housing 32 pivots on the bridging component 40 at the maximal angle. Meanwhile, the first angle $\theta_1$ can substantially be 67.5 degrees.

When the first housing 32 rotates from the position as shown in FIG. 5 to a position as shown in FIG. 6 along the clockwise direction D1, because the first housing 32 can not pivot on the bridging component 40 anymore, the torque of the second pivoting mechanism 38 applied by the user must be greater than the torque of the first pivoting mechanism 34, so as to drive the second pivoting mechanism 38. Afterward, the first housing 32 presses the bridging component 40, so that the bending portion 46 of the bridging component 40 rotates around the supporting surface 48, so as to drive the second end 403 of the bridging component 40 to pivot on the second pivoting mechanism 38. Meanwhile, an end of the bending portion 46 contacts against the supporting surface 48 for arising the side of the second housing 36, then, the gap H is formed between the second housing 36 and the supporting surface 48. The gap H varies with the rotation angle of the bending portion 46 relative to the second housing 36. As shown in FIG. 6, when the first housing 32 pivots on the second housing 36 at the second angle $\theta_2$ along the clockwise direction D1, the second contacting portion 44 of the bridging component 40 contacts against the side of the second housing 36, which means that is the maximum rotation angle of the bridging component 40 relative to the second housing 36. The second angle $\theta_2$ can substantially be 135 degrees. At this time, there is the maximum height of the side of the second housing 36 pushed by the bending portion 46 accordingly, and the third angle $\theta_3$ is formed between the second housing 36 and the supporting surface 48. The third angle $\theta_3$ can substantially be less than 5 degrees. Therefore, when the first housing 32 rotates around the second housing 36 at the second angle $\theta_2$ along the clockwise direction D1, the second housing 36 is tilted for comfortable operation of the keyboard disposed on the second housing 36 at the third angle $\theta_3$. Besides, when the first housing 32 rotates around the second housing 36, the gap H formed between the second housing 36 and the supporting surface 48 can prevent the bottom of the second housing 36 from placing on the supporting surface 48 directly. Thus, the gap H can increase the heat convection space between the second housing 36 and the supporting surface 48 for increasing heat-dissipating efficiency of electronic components disposed inside the second housing 36.

Figure 7:
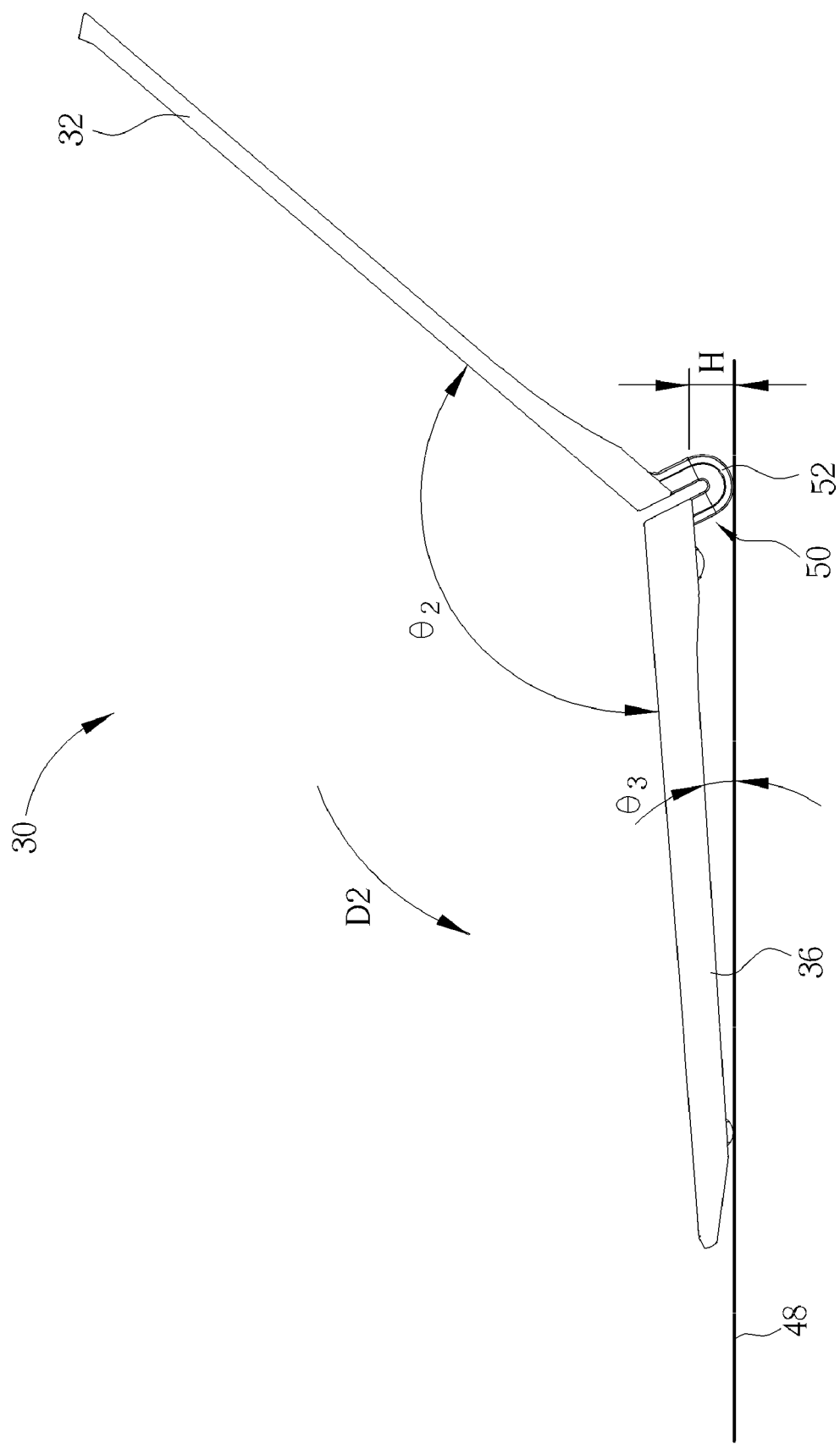
FIG. 7 is a diagram of the electronic device at the maximal angle according to one of the embodiments of the present invention.
Figure 8:
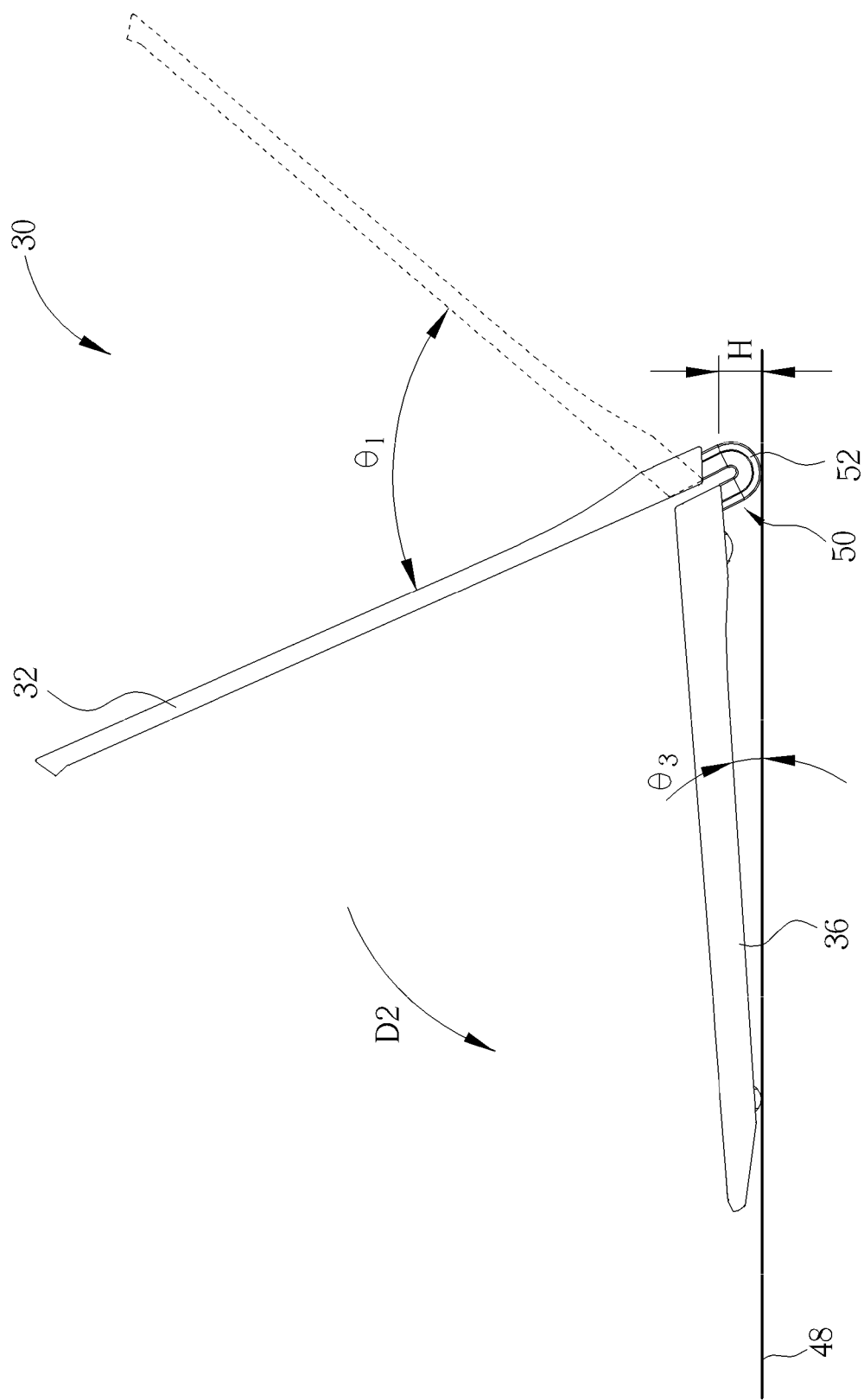
FIG. 8 is a diagram of the electronic device in the closing process according to one of the embodiments of the present invention.
Figure 9:
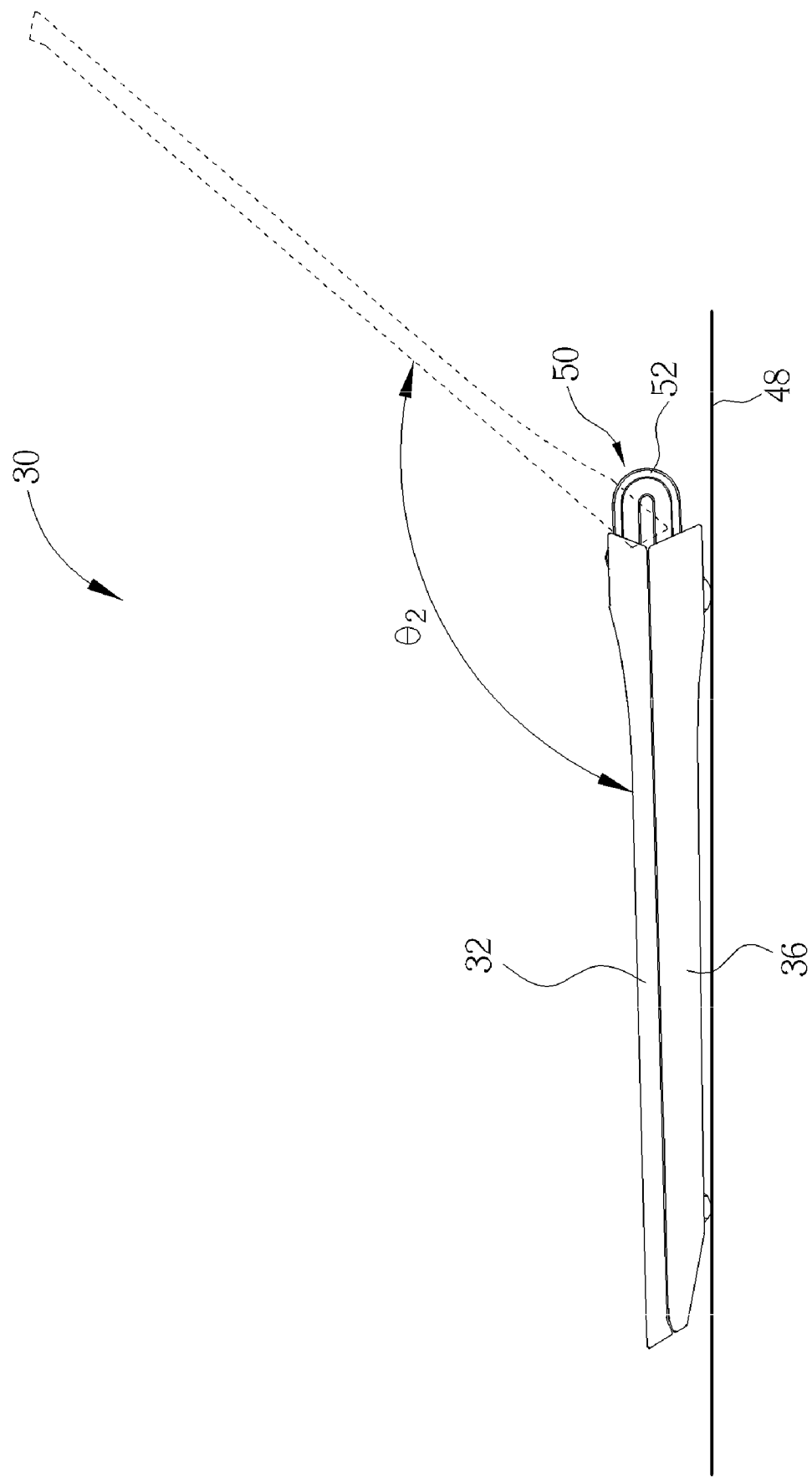
FIG. 9 is a diagram of the closed electronic device according to one of the embodiments of the present invention.

Similar to the above-mentioned opening procedure, the closing procedure of the electronic device 30 is introduced as follows. Please refer to FIG. 2 and FIG. 7 to FIG. 9. FIG. 7 is a diagram of the electronic device 30 at the maximum opening angle according to one of the embodiments of the present invention. FIG. 8 is a diagram of the electronic device 30 in the closing process according to one of the embodiments of the present invention. FIG. 9 is a diagram of the closed electronic device 30 according to one of the embodiments of the present invention. The first housing 32 can pivot from a position as shown in FIG. 7 to a position as shown in FIG. 8 along a counterclockwise direction D2 when folding the electronic device 30. The torque of the second pivoting mechanism 38 pivoting on the second end 403 is greater than the torque of the first pivoting mechanism 34 pivoting on the first end 401. When the first housing 32 starts to pivot on the bridging component 40, the bridging component 40 does not rotate around the second housing 36, and the angle formed between the bridging component 40 and the supporting surface 48 keeps the third angle $\theta_3$ until the side of the first housing 32 contacts against the first contacting portion 42 of the bridging component 40. When the first housing 32 pivots on the first end 401 at the first angle $\theta_1$ along the counterclockwise direction D2, the side of the first housing 32 contacts against the first contacting portion 42 of the bridging component 40. Because the first housing 32 can not pivot on the bridging component 40 anymore, the user must apply a torque greater than the torque of the first pivoting mechanism 34 for driving the second pivoting mechanism 38. Meanwhile, the bending portion 46 can rotate around the second housing 36, so as to drive the second end 403 of the bridging component 40 to pivot on the second pivoting mechanism 38 at the second angle $\theta_2$ along the counterclockwise direction D2, which means the first housing 32 can pivot from the position as shown in FIG. 6 (the dotted line as shown in the FIG. 8 and FIG. 9) to a position as shown in FIG. 9. The gap between the second housing 36 and the supporting surface 48 decreases accordingly, and the bottom of the second housing 36 is placed on the supporting surface 48 horizontally when the electronic device is folded completely. Thus, the electronic device 30 of the present invention can adjust the inclined angle between the second housing 36 and the supporting surface 48 according to the angle variation between the first housing 32 and the second housing 36.

Comparing to the prior art, the electronic device with a biaxial pivoting mechanism of the present invention can adjust the inclined angle between the second housing and the supporting surface according to the angle variation between the first housing and the second housing. The present invention not only can adjust the inclined angle of the keyboard and the height of the liquid crystal display for comfortable operation, but also can form the gap between the housing and the supporting surface so as to increase the heat-dissipating efficiency of the electronic device.

Those skilled in the art will readily observe that numerous modifications and alterations of the device and method may be made while retaining the teachings of the invention.

What is claimed is:

1. An electronic device comprising:
   a first housing;
   a first pivoting mechanism disposed on a side of the first housing;
   a second housing;
   a second pivoting mechanism disposed on a side of the second housing; and
   a bridging component, a first end and a second end of the bridging component being respectively pivoted on the first pivoting mechanism and the second pivoting mechanism, the bridging component comprising:
     a first contacting portion for contacting against the side of the first housing when the first pivoting mechanism pivots on the first end so that the first housing rotates around the second housing at a first angle; and
     a second contacting portion for contacting against the side of the second housing when the second end pivots on the second pivoting mechanism so that the first housing rotates around the second housing at a second angle greater than the first angle.

2. The electronic device of claim 1, wherein a torque of the first pivoting mechanism pivoting on the first end is smaller than a torque of the second pivoting mechanism pivoting on the second end.

3. The electronic device of claim 1, wherein the bridging component comprises a bending portion connected to the first contacting portion and the second contacting portion and disposed on a supporting surface, and the bending portion rotates around the supporting surface to drive the second end of the bridging component to pivot on the second pivoting mechanism so that a gap is formed between the second housing and the supporting surface when the side of the first housing contacts against the first contacting portion of the bridging component.

4. The electronic device of claim 3, wherein a third angle is formed between the second housing and the supporting surface when the side of the second housing contacts against the second contacting portion of the bridging component.

5. The electronic device of claim 4, wherein the third angle is substantially less than 5 degrees.

6. The electronic device of claim 3, wherein the bridging component is a U-shaped structure.

7. The electronic device of claim 1, wherein the first angle is substantially 67.5 degrees.

8. The electronic device of claim 1, wherein the second angle is substantially 135 degrees.

9. The electronic device of claim 1 further comprising:
   a covering component for covering the bridging component.

10. The electronic device of claim 9 further comprising:
    a buffer disposed on an outer side of the covering component for preventing abrasion of the covering component.

* * * * *